United States Patent
Goekay

(10) Patent No.: US 11,425,510 B2
(45) Date of Patent: Aug. 23, 2022

(54) METHOD OF COUPLING HEARING DEVICES TO ONE ANOTHER, AND HEARING DEVICE

(71) Applicant: SIVANTOS PTE. LTD., Singapore (SG)

(72) Inventor: Umut Goekay, Koenigswinter (DE)

(73) Assignee: Sivantos Pte. Ltd., Singapore (SG)

( * ) Notice: Subject to any disclaimer, the term of this patent is extended or adjusted under 35 U.S.C. 154(b) by 59 days.

(21) Appl. No.: 17/120,511

(22) Filed: Dec. 14, 2020

(65) Prior Publication Data

US 2021/0185455 A1    Jun. 17, 2021

(30) Foreign Application Priority Data

Dec. 12, 2019  (DE) .................. 10 2019 219 510.5

(51) Int. Cl.
*H04R 25/00* (2006.01)

(52) U.S. Cl.
CPC ............ *H04R 25/43* (2013.01); *H04R 25/554* (2013.01); *H04R 2225/41* (2013.01); *H04R 2225/55* (2013.01)

(58) Field of Classification Search
USPC .......................................................... 381/312
See application file for complete search history.

(56) References Cited

U.S. PATENT DOCUMENTS

| | | | |
|---|---|---|---|
| 9,949,040 B2 | 4/2018 | Bergmann et al. | |
| 10,129,663 B2 | 11/2018 | Jensen et al. | |
| 10,284,971 B2 | 5/2019 | Secall et al. | |
| 11,218,821 B2 | 1/2022 | Doebeli | |
| 2006/0067550 A1 | 3/2006 | Puder et al. | |
| 2008/0057868 A1 | 3/2008 | Chang | |
| 2010/0110837 A1 | 5/2010 | Jung et al. | |
| 2016/0360326 A1* | 12/2016 | Bergmann | ............ H04R 25/43 |
| 2017/0180350 A1 | 6/2017 | Kaufman | |

FOREIGN PATENT DOCUMENTS

| | | |
|---|---|---|
| CN | 102273106 A | 12/2011 |
| CN | 103117836 A | 5/2013 |
| CN | 105898662 A | 8/2016 |
| CN | 106797519 A | 5/2017 |
| EP | 1643801 A2 | 4/2006 |
| EP | 3101919 A1 | 12/2016 |
| KR | 20080021880 A | 3/2008 |
| WO | 2019029828 A1 | 2/2019 |

* cited by examiner

*Primary Examiner* — Phylesha Dabney
(74) *Attorney, Agent, or Firm* — Laurence A. Greenberg; Werner H. Stemer; Ralph E. Locher

(57) ABSTRACT

A first hearing device is assigned to a first user and a second hearing device is assigned to another, second user. The first hearing device emits a first acoustic ID of a voice of the first user as a coupling request. The second hearing device receives the first acoustic ID and compares the first acoustic ID with a second acoustic ID. If the first acoustic ID matches the second acoustic ID the second hearing device emits a coupling acceptance so that the first hearing device is coupled with the second hearing device for exchanging data between these two hearing devices. There is also described a corresponding hearing device for carrying out the method.

13 Claims, 3 Drawing Sheets

METHOD OF COUPLING HEARING DEVICES TO ONE ANOTHER, AND HEARING DEVICE

CROSS-REFERENCE TO RELATED APPLICATION

This application claims the priority, under 35 U.S.C. § 119, of German patent application DE 10 2019 219 510, filed Dec. 12, 2019; the prior application is herewith incorporated by reference in its entirety.

BACKGROUND OF THE INVENTION

Field of the Invention

The invention relates to a method in which two hearing devices are coupled to one another, and to a corresponding hearing device.

A hearing device is usually assigned to an individual user and is worn by the user in or on the ear to capture sound from the environment and to output the sound in modified form. To this end the hearing device has a microphone, which captures the acoustic signals and converts them into an electrical input signal. The electrical input signal is fed to a signal processor of the hearing device for modification. The output of the signal processor is an electrical output signal, which is then converted back into sound and output to the user via a receiver of the hearing device.

If multiple users, each with a respective hearing device, meet at the same place, it can be useful for the hearing devices to connect to each other in a network to exchange data. Hearing devices of different users that are connected together in a network are described, for example, in European published patent applications EP 1 643 801 A2 and EP 3 101 919 A1 (corresponding to U.S. Pat. No. 9,949,040 B2).

To exchange data, the hearing devices must be coupled to each other so that a network is formed in which the hearing devices can then exchange data with one another.

BRIEF SUMMARY OF THE INVENTION

It is accordingly an object of the invention to provide a method which overcomes the above-mentioned disadvantages of the heretofore-known devices and methods of this general type and which provides for coupling hearing devices together in a common network as simply and reliably as possible. The object is to couple multiple hearing devices to each other with as little interaction as possible, i.e., as far as possible automatically and without requiring user intervention.

With the above and other objects in view there is provided, in accordance with the invention, a method in which hearing devices are coupled to one another. The method comprises:
   providing a first hearing device that is assigned to a first user and a second hearing device that is assigned to a second user;
   emitting a coupling request from the first hearing device, the coupling request being a first acoustic ID of a voice of the first user;
   receiving the first acoustic ID with the second hearing device and comparing the first acoustic ID with a second acoustic ID; and
   if the first acoustic ID matches the second acoustic ID, emitting a coupling acceptance with the second hearing device, and coupling the first hearing device with the second hearing device for data exchange between the first and second two hearing devices.

The method is used in particular for coupling multiple hearing devices to each other in a common network. In general, a first hearing device is assigned to a first user and a second hearing device is assigned to another, second user. In the method, the first hearing device emits a first acoustic ID of a voice of the first user as a coupling request. The second hearing device receives the first acoustic ID and compares it with a second acoustic ID. The second hearing device then emits a coupling acceptance if the first acoustic ID matches the second acoustic ID, so that the first hearing device is coupled with the second hearing device for data exchange between these two hearing devices.

Relative to a particular hearing device, the acoustic ID belonging to the user of this hearing device is also referred to as the user's "own acoustic ID". On the other hand, relative to a particular hearing device, the acoustic ID belonging to a user of another hearing device is also referred to as the user's "own acoustic ID". Accordingly, the first acoustic ID mentioned above for the first hearing device is its own acoustic ID, but for the second hearing device is an external acoustic ID. For the first hearing device, the second acoustic ID mentioned above is either an external ID or its own acoustic ID, depending on whether the user belonging to this acoustic ID is the same or not. For the second hearing device, however, the second acoustic ID is always an external acoustic ID.

In this description, a distinction is made between a first and a second hearing device in order to illustrate the method. However, their roles in the method are in principle interchangeable. The two hearing devices also do not necessarily have to be different or identical. The statements in relation to the first hearing device therefore also apply mutatis mutandis, but not necessarily, to the second hearing device and vice versa.

An acoustic ID is generally used to identify a particular user as unambiguously as possible. The acoustic ID is therefore also referred to as an acoustic fingerprint to express the fact that the acoustic ID is unique to each user. In particular, a given acoustic ID is always generated from a voice, i.e. based on an actual sound signal. In the following, the acoustic ID is referred to more simply by ID. In particular, the ID is an identification mark which contains information about the characteristics of the voice of a particular user. In a suitable design, the ID is a list of values of a plurality of voice parameters of a user. Since the voice is individual, the ID is also individual and enables a particularly reliable identification of a user. The fact that the second hearing device compares the first and the second acoustic ID allows the first user to be identified by the second hearing device and, if these match, this user is accordingly successfully identified. In this context, the first ID is therefore also designated as the actual ID, i.e. the ID which is actually present. The second ID is also referred to as the target ID, i.e. the ID that is expected for successful identification. When comparing the IDs, a complete match is not strictly necessary, rather a sufficient match within a tolerance range is typically appropriate.

The emission of the coupling request by the first hearing device is not necessarily aimed directly at the second hearing device and nor does it depend necessarily on the presence of another hearing device in the environment. In a fundamentally suitable design, the coupling request and thus the emission of the first ID is correspondingly undirected. In general, the coupling request is emitted in a request mode or broadcast mode of the first hearing device to all hearing devices potentially located nearby. The reception of the coupling request by the second hearing device takes place, in particular, in an acceptance mode or listening mode of the second hearing device, i.e. the second hearing device searches the environment for coupling requests from other hearing devices. In principle, the request and acceptance modes can also be active at the same time in a single hearing device.

Both hearing devices each have an interface for data exchange with each other and for communication in general. The IDs are emitted and received via the interface, and once the coupling is completed other data are then transmitted, preferably audio data, setting parameters, other data, or a combination of these. The respective interface usually has a limited range, e.g. a maximum of 10 m, so that a coupling is only carried out automatically in a spatially limited zone around the respective hearing device. Therefore, two hearing devices are only coupled together if they are located within range of each other, i.e. in spatial proximity to each other, ensuring that the coupling is desired by both users and is also relevant to them. If no other hearing device is within range, on the other hand, a coupling request from the first hearing device is void, i.e. it is unsuccessful.

One advantage of the invention is that by comparing the acoustic IDs and due to the resulting coupling, a plurality of hearing devices are connected to each other particularly simply and reliably, and then form a common network for data exchange between themselves. In this case, the coupling of only two hearing devices is described as an example, but the concept is generally applicable to any number of hearing devices. The use of the, in particular individual, acoustic ID also ensures that the correct coupling partners, i.e. users, are connected to each other during the coupling. This is particularly advantageous in situations where several users, each with a hearing device, come together and where a selection is required, since a given user does not necessarily want to be connected to every other user in the environment. An example of this is a conversation between two hearing aid wearers where there are other hearing aid wearers nearby. In such a situation, a user would typically want to be connected primarily to a specific conversation partner, i.e. a user with whom they are having a conversation, but not to other users. Through the use of acoustic IDs for coupling, a targeted identification, selection and coupling with such relevant coupling partners takes place.

The second acoustic ID is either stored in the second hearing device, directly in a memory of the second hearing device, or generated as part of the method, in particular by the second hearing device. If the second ID is generated during the method, this appropriately takes place when a coupling request is received or when a voice is detected in the environment. Both designs can also be combined.

In a particularly preferred design, the second hearing device has a microphone which it uses to record a voice from the environment, and from this generates the second acoustic ID. The voice is primarily any voice in the environment, but not the voice of the second user. Accordingly, the voice recorded by the second hearing device is an external voice, i.e. either the voice of the first user, provided that they are within range of the microphone, or a different voice. It is particularly important that the second hearing device searches the environment, preferably on a recurrent basis, for voices of other users. As soon as a voice is found, an acoustic ID is generated directly from it, for later use in coupling. In particular, in this way a given hearing device collects multiple external IDs over time, which are then compared with any ID that might be received.

A particular advantage of recording the second ID with the microphone and sending the first ID via the interfaces of the hearing devices is that two different transmission channels are used to identify a user. On the one hand, the first hearing device transmits an ID of the first user via a signal path, by sending the first ID, i.e. its own ID, via the interface to other hearing devices in the vicinity. On the other hand, the second hearing device generates an ID of a user over an air path by recording the voice of this user, which is an acoustic signal, with a microphone and then generating the second acoustic ID, i.e. an external ID. In this case, a distinction is therefore made between a transmission of sound, i.e. an acoustic signal, over an air path, on the one hand, and a transmission of an in particular electromagnetic signal over a signal path, on the other. In one design the signal path is wireless, which means that it also takes place through the air, but importantly the format of the information is different to that used for a user's voice, namely an acoustic signal on the one hand and an electromagnetic signal on the other. Finally, the second hearing device compares the two IDs which were obtained from different transmission channels, in order to identify the first user. No user interaction with the users is necessary and preferably none takes place, instead the whole method is performed automatically by the hearing devices.

After the two hearing devices have been coupled with each other, data exchange is possible. In a preferred design, the voices of the users are transmitted during the data exchange, whereby a radio connection is preferably formed. In other words, a given hearing device has a microphone which is used to record the voice of its user. The microphone generates a corresponding audio signal, which is further processed or not depending on the design, and then transmitted via the interface to the other hearing device. The other hearing device receives the voice of the now other user, and converts it back into sound by means of a receiver, for output to its own user. This is done in particular in both directions, so that users can talk to each other over the network. The air path between the two users is thereby bypassed, which is advantageous particularly in noisy or interference-prone environments.

The emission of the coupling request with the first and own ID is inherently independent of the presence of the second and generally, any other user. However, the coupling request is specifically and advantageously only emitted if the first hearing device detects that a second hearing device is within range. In a particularly preferred design, the first hearing device emits the first acoustic ID when the first hearing device detects a conversation situation. In particular, a conversation situation is understood to mean that at least two people, in particular users of hearing devices, are speaking to each other, typically by taking turns. Thus if the first hearing device detects the presence of another user in the vicinity, the request mode is activated and the first, i.e. the device's own ID, is emitted. This ensures that the first ID is only emitted when a potential coupling partner is also actually present. However, the other conversation partner may not be wearing a hearing device. In that case the coupling request fails.

In order to recognize the presence of another user, each hearing device is appropriately designed to detect an external voice. For this purpose, the hearing device has a microphone and a voice analysis unit. The hearing device uses the microphone to record sound from the environment, generate an input signal from it and supply this signal to the voice analysis unit. The unit then detects whether or not an external voice is present in the environment. For this purpose, advantageously and, if present, a voice is first detected in the sound and an acoustic ID is generated from it. This is then compared, for example, with the acoustic ID of the user assigned to the hearing device, i.e. the user's own ID. In particular, the user's own ID is stored in the hearing device or generated thereby. Preferably, the voice analysis unit also serves to record the user's own voice and to generate an acoustic ID from it. These functions are alternatively implemented by mutually separate voice analysis units. Now, if multiple different voices, i.e. also different IDs, are present in a given period of time, this means a conversation is underway.

There may be multiple external voices present and the conversation may not necessarily involve all of the associated users. In other words, the conversation situation may be limited to a subset of users in the environment. Typically, a conversation situation exists only with such external users as are positioned in front of the user, i.e. located opposite the user. In an advantageous design, therefore, for the second acoustic ID the second hearing device records a voice from only a subregion of the environment, namely from a subregion in which a conversation partner of the second user is potentially present. This subregion is generally a limited region of space around the user. In a suitable design, the subregion is a frontal semicircle or frontal quadrant of the space with respect to the second user. Another suitable arrangement is one in which the subregion is a directional lobe of a beamformer of the second hearing device. Overall, the coupling of the hearing devices is therefore direction-dependent in order to further ensure that two hearing devices are only coupled if their users actually want to talk to each other. This is normally the case when the users are facing each other head-on, or when a beamformer of a hearing device is directed at a user and, if appropriate, also tracks this user.

A successful coupling of the two hearing devices suitably requires the emission of the coupling request by the first hearing device, its reception by the second hearing device and vice versa, the emission of the coupling acceptance by the second hearing device and its reception by the first hearing device. This means that at least the first user is identified. The same steps for the coupling are also advantageously carried out in reverse in order to also identify the second user in the same way. To this end, in a suitable design the coupling acceptance by the second hearing device contains a coupling request to the first hearing device. This coupling request includes the second user's own acoustic ID, which—as for the first ID—is received by the first hearing device and—as for the second ID—is compared with a stored external acoustic ID. The hearing devices thus perform a mutual comparison of the IDs of the two users. The first hearing device then also emits a coupling acceptance to the second hearing device if the acoustic ID of the second user matches the stored acoustic ID. In one design, the stored acoustic ID is generated from the ambient sound by a voice analysis unit of the hearing device, as described above. In short: the hearing devices carry out an alternate identification of their users, i.e. a bidirectional identification. This makes the resulting coupling particularly reliable.

An example application of an embodiment of the method will be described in more detail below. Two users each with one hearing device approach each other and begin to talk to each other. A first of the two hearing devices uses a microphone to detect that another user, i.e. a second user, is present in the environment and is also speaking. This first hearing device therefore sends out the acoustic ID of its own user, i.e. of a first user. This first ID is received by the second hearing device, which in turn uses a microphone to record sound from the environment and recognizes the voice of the first user in it. From this voice an acoustic ID is generated, which is now designated as the second acoustic ID, but which based on the present situation, like the first acoustic ID, is an ID of the first user. When comparing the two IDs, i.e. the self-generated ID on the one hand and the received ID on the other, the second hearing device now finds that the IDs match and that the hearing device of the first user is therefore ready for coupling, e.g. to continue the conversation by means of data exchange. Upon this finding, the second hearing device sends a coupling acceptance to the first hearing device, on receipt of which by the first hearing device a coupling is carried out. As an alternative, only a partial coupling takes place at first and a complete coupling only takes place after the second hearing device conversely has also sent a self-generated ID of the second user, i.e. a third ID, to the first hearing device and this has been successfully compared by the first hearing device with an ID of the second user, i.e. a fourth ID, generated by the first hearing device. This ID of the second user generated by the first hearing device is generated in the same way, by the first hearing device using a microphone to record sound from the environment and detecting a voice therein.

Preferably, the respective acoustic ID is generated based on at least one voice parameter of a respective voice and is selected from a set of voice parameters, comprising: vocal tract frequency, volume, voice frequency, also known as pitch, voice height, speech rate, frequency range, respiratory rate, resting level, vowel-consonant changes. The above-mentioned voice parameters are particularly suitable for generating an acoustic ID and for identifying and thus distinguishing different users sufficiently accurately. In principle, even the use of a single voice parameter is sufficient, but a combination of a plurality of voice parameters is more appropriate when generating an ID. For example, the ID is then a list of values for each voice parameter. In general, an acoustic ID is thus generated by first detecting a voice and then determining one or more voice parameters of this voice. If necessary, a plurality of voice parameters are combined to form an ID.

All of the voice parameters mentioned can be easily determined from an input signal of a microphone of the respective hearing device, for example by means of a level, frequency, spectral or time-domain analysis. The way in which the individual voice parameters are actually determined is of secondary importance here. What is more relevant is that these voice parameters are used to generate an acoustic ID and their respective values are determined and, in particular, measured for this purpose.

The vocal tract frequency indicates in particular the fundamental frequency of a user's vocal tract. The vocal tract frequency forms, so to speak, the fundamental frequency of the vocal cords, which form the characteristics of a voice. The vocal tract frequency thus characterizes the voice of a user. Typically, the vocal tract frequency is in the region of 100 Hz for men and 150 Hz for women.

The sound volume indicates in particular, how loud the user speaks. The volume is preferably determined with a level meter.

The voice frequency (pitch) indicates in particular the frequency of a user's voice at the current time. For this measurement, the voice frequency is conveniently averaged over a short period of e.g. 1 s. The voice frequency is preferably determined by averaging the frequency during a user's speech activity.

The voice increase indicates, in particular, the level by which a user's voice rises at the beginning of a speech activity. The voice increase is preferably determined by measuring the amplitude, i.e. the level, of the speaker over a specific period of time at the beginning of the speech activity and determining its average ascent curve. A level curve is therefore measured, preferably by means of a level meter.

The vowel-consonant change indicates, in particular, when a user switches between vowels and consonants. Vowel-consonant changes are preferably determined by detecting vowels and consonants in the voice and determining the times at which a change occurs. An equivalent to this is to determine only a consonant change, i.e. a change between different consonants.

The speech rate indicates in particular how fast the user speaks. The speech rate is preferably determined by measuring the vowel-consonant changes and determining from this how quickly this change from vowel to consonant takes place, i.e. how often such a change from vowel to consonant takes place within a specific period of time. For this purpose, it is appropriate to examine the rate of change of the frequency spectrum of the input signal.

In particular, the frequency range indicates which frequencies a user uses, or can potentially use, for communication with their voice during their own speech activity, averaged over a specific period of time. The frequency range is preferably determined by averaging which frequencies a user uses with which amplitude over a specific period of time. These frequencies and their amplitudes are advantageously stored in a frequency-amplitude curve. Such a measurement is advantageously carried out on a recurring basis, e.g. every millisecond or every 100 ms.

The respiration rate indicates, in particular, how fast the respective user is breathing. The respiration rate is preferably determined by using the microphone to measure the sounds generated by breathing when no speech activity is present. A body contact microphone is particularly suitable for this purpose. The respiration rate is measured in particular by analyzing the temporal change, in particular the change of level, of low frequencies in the frequency spectrum of the input signal.

The resting level indicates in particular the amplitude present during an inactive phase, i.e. while the user is not speaking. The resting level is not a level of ambient noise, rather the level that a user generates him/herself without speaking, e.g. by breathing. For example, the resting level is determined by averaging the level change described above for measuring the respiration rate.

In a suitable design, the first ID which is emitted by the first hearing device as a coupling request is stored in a memory of the first hearing device. For example, the first ID, i.e. the ID of the user of the respective hearing device, is determined as part of a calibration procedure and then stored.

Alternatively, the first acoustic ID is generated by the first hearing device by the latter recording the first user's own voice. The hearing device also determines one or more voice parameters in the process, and from these it then generates the ID of its own user, i.e. its own ID. This is also advantageously stored in a memory of the hearing device for subsequent re-use.

Another advantage is a combination in which an ID that has been determined by the calibration procedure is checked by a fresh recording of the user's own voice and updated if necessary.

The statements relating to the calibration, generation and storage of the ID are also advantageously applied to the second hearing device in order to generate the second ID.

The respective external acoustic ID is advantageously stored in a contact database of the respective hearing device. The contact database is thus a kind of telephone book and allows for easier coupling in the event of a repeated coupling of the users. The acoustic ID does not then have to be generated again each time using the microphone and the voice analysis unit, instead the IDs stored in the contact database are directly compared with a received ID to identify a user.

Preferably, the data exchange takes place wirelessly. In a more practical design, the first and the second hearing device each have a wireless interface for the data exchange. The wireless interface is preferably a Bluetooth interface. The data exchange is then carried out via a Bluetooth connection and the coupling of the hearing devices serves in particular to establish the Bluetooth connection, and in particular also the pairing of the hearing devices for this purpose.

A hearing device according to the invention is designed to carry out a method as described above. Preferably, the hearing device has a control unit for this purpose. In the control unit, the method is implemented, in particular, in software or circuit technology, or a combination of these. For example, the control unit is designed as a microprocessor or as an ASIC or a combination of these. In particular, the voice analysis unit described is integrated into the control unit.

The described method is generally applicable to any hearing device. However, a particular preference is given to a design in which a hearing device is used for treating a hearing-impaired user. To this end, the hearing device has a microphone which records sound from the surroundings and generates an electrical input signal. This is fed to a signal processor of the hearing device for modification. The signal processor is preferably a part of the control unit. The modification takes place in particular on the basis of an individual audiogram of the user assigned to the hearing device, so that an individual hearing deficit of the user is compensated. As a result the signal processor outputs an electrical output signal, which is then converted back into sound and output to the user via a receiver of the hearing device.

For the various described functions of a microphone of a hearing device (e.g. recording of the user's voice or an external voice, detection of a conversation situation), either the same microphone of the hearing device is always used or else the hearing device has a plurality of microphones over which the different functions are distributed. The distribution does not need to be fixed, but can also vary over time as required.

A hearing device is preferably a monaural or binaural hearing aid. A binaural hearing aid comprises two separate devices, which are worn by the user on different sides, i.e. in or on the left and right ears. A monaural hearing aid only has a single device, which is worn by the user on or in the left or right ear. Especially in the case of a binaural hearing aid, in an advantageous design one of the individual devices comprises the interface for data exchange with other hearing aids, whereas the other device does not directly exchange data with other hearing aids, but directly subscribes to the interface on the network via the individual device. This arrangement saves energy during operation, since both individual devices are connected to the network via only one interface.

Other features which are considered as characteristic for the invention are set forth in the appended claims.

Although the invention is illustrated and described herein as embodied in a method in which two hearing devices are coupled, and a hearing device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
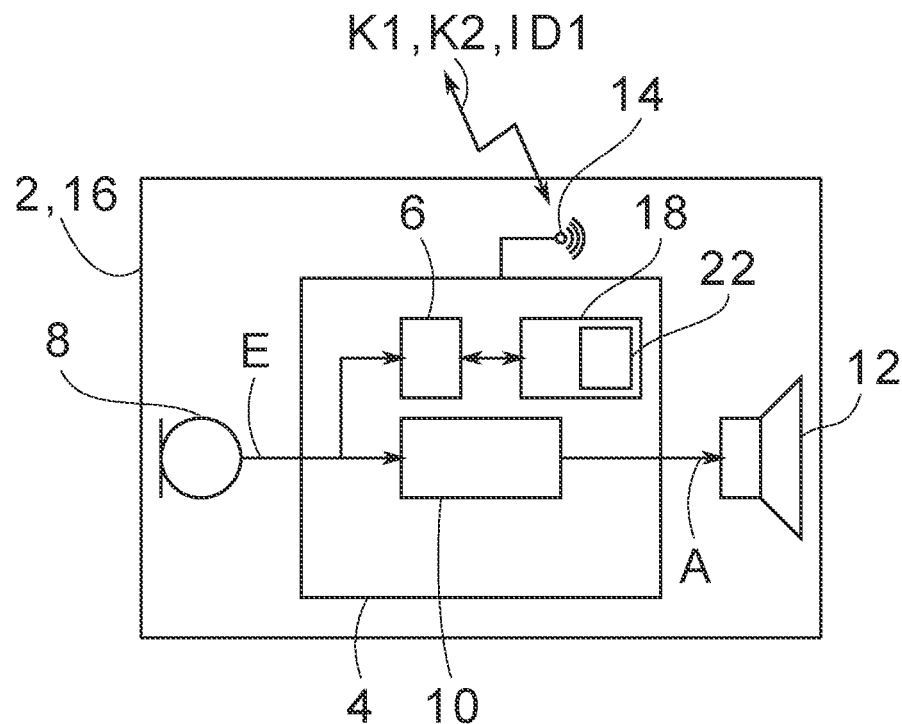
FIG. 1 is a schematic view of a hearing device.

Referring now to the figures of the drawing in detail and first, in particular, to FIG. 1 thereof, there is shown an exemplary embodiment of a hearing device 2, 16 according to the invention. The hearing device 2, 16 is configured to carry out a method as described in more detail below. For this purpose, the hearing device 2, 16 has a control unit 4. In this case, a voice analysis unit 6 is also integrated into the control unit 4. Furthermore, the hearing device 2, 16 shown is also used for treating a hearing-impaired user N or a user O (cf. FIG. 2), but this fact is independent of the method described below. To this end the hearing device 2 has a microphone 8, which records sound from the environment and generates an electrical input signal E. FIG. 1 shows only a single microphone 8, but a variant with a plurality of microphones 8 is also suitable. In the exemplary embodiment shown, the input signal E is used to modify a signal processor 10 of the hearing device 2, 16. The signal processor 10 is preferably a part of the control unit 4. In the exemplary embodiment shown the modification is carried out on the basis of an individual audiogram of the user N, O which is assigned to the hearing device 2, 16, so that an individual hearing deficit of the user N, O is compensated. The result of the signal processor 10 is to output an electrical output signal A, which is then converted back into sound via a receiver 12 of the hearing device 2, 16 and output to the user N, O. Each hearing device 2, 16 here is a monaural or a binaural hearing aid 2, 16. The hearing device 2, 16 shown also has an interface 14 for data exchange, which here is generally a wireless interface.

Figure 2:
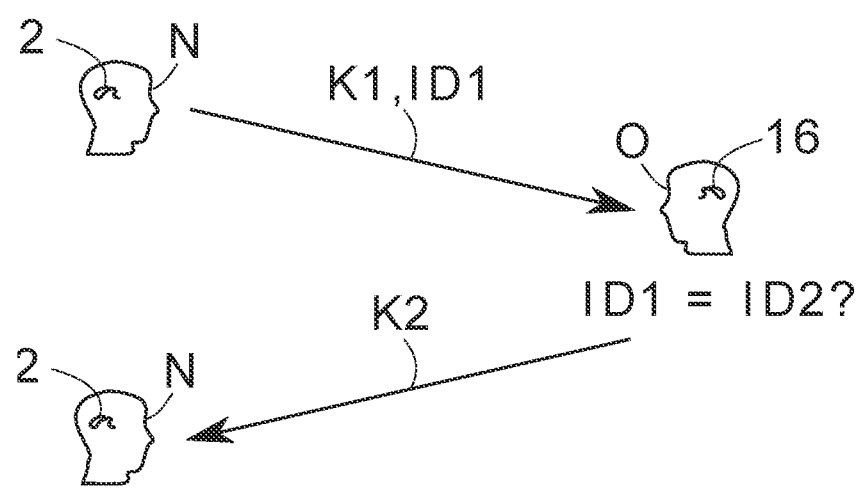
FIG. 2 is a diagram illustrating the method according to the invention.

An exemplary embodiment of a method according to the invention is shown in FIG. 2. The method is used to couple multiple hearing devices 2, 16 to each other in a common network. FIG. 2 shows an example of a first hearing device 2, assigned to a first user N, and a second hearing device 16, assigned to another, second user O. The first and the second hearing device 2, 16 are each designed as shown in FIG. 1, for example. The different reference signs for the first and second hearing devices 2, 16 are used in this case mainly to distinguish the first and second hearing devices 2, 16 in the description of the method. However, the roles of the two hearing devices 2, 16 are essentially interchangeable. The two hearing devices 2, 16 also do not necessarily have to be different or identical, both options are possible and suitable.

FIG. 2 shows the sequence of the method from top to bottom. In the method, the first hearing device 2 emits a first acoustic ID ID1 of a voice of the first user N as a coupling request K1. The second hearing device 16 receives the first acoustic ID ID1 and compares it with a second acoustic ID ID2. The second hearing device 16 then emits a coupling acceptance K2 if the first acoustic ID ID1 matches the second acoustic ID ID2, so that the first hearing device 2 is coupled with the second hearing device 16, for data exchange between these two hearing devices 2, 16.

Relative to a particular hearing device 2, 16, the acoustic ID ID1, ID2, ID3, ID4 belonging to the user N, O of this hearing device 2 is also referred to as its "own acoustic ID". On the other hand, relative to a particular hearing device 2, 16, the acoustic ID ID1, ID2, ID3, ID4 belonging to a user of another hearing device is also referred to as an "external acoustic ID". Accordingly, the first acoustic ID ID1 mentioned above for the first hearing device 2 is its own acoustic ID, but for the second hearing device 16 it is an external acoustic ID. For the first hearing device 2, the second acoustic ID ID2 mentioned above is either an external or its own acoustic ID, depending on whether the user N for this acoustic ID ID2 is the same or not. For the second hearing device 16, however, the second acoustic ID ID2 is always an external acoustic ID.

An acoustic ID ID1, ID2, ID3, ID4 is generally used to identify a particular user N, O as unambiguously as possible. The acoustic ID ID1, ID2, ID3, ID4 is therefore also referred to as an acoustic fingerprint to express the fact that the acoustic ID ID1, ID2, ID3, ID4 is individual for each user N, O. In the following, the acoustic ID ID1, ID2, ID3, ID4 is also simply referred to as the ID ID1, ID2, ID3, ID4. The ID ID1, ID2, ID3, ID4 is an identification mark that contains information about the characteristics of the voice of a given user N, O, for example, the ID ID1, ID2, ID3, ID4 is a list of values of a plurality of voice parameters of a user N, O. When comparing the IDs ID1, ID2, ID3, ID4, a complete match is not strictly necessary, rather a sufficient match within a tolerance range is typically appropriate.

The emission of the coupling request K1 by the first hearing device 2 is not necessarily aimed directly at the second hearing device 16, nor does it depend necessarily on the presence of another hearing device in the environment. In general, the coupling request K1 is emitted in a request mode or broadcast mode of the first hearing device 2 to all hearing devices 16 potentially located nearby. The reception of the coupling request K1 by the second hearing device 16 takes place correspondingly in an acceptance mode or listening mode of the second hearing device 16, i.e. the second hearing device 16 searches the environment for coupling requests K1 from other hearing devices 2. In principle, the request and acceptance modes can also be active in a single hearing device 2, 16 at the same time.

The IDs ID1, ID3 are emitted and received via the respective interface 14 and once the coupling is completed, other data are then transmitted, for example audio data, setting parameters, other data or a combination of these. However, the IDs ID2 and ID4 are not necessarily transmitted and are used primarily for internal comparison. The respective interface 14 usually has a limited range, e.g. a maximum of 10 m, so that a coupling is only carried out automatically in a spatially limited area around the respective hearing device 2, 16.

The second acoustic ID ID2 is stored either in the second hearing device 16, directly in a memory device 18, or generated by the second hearing device 16 as part of the method, for example. If the second ID ID2 is generated during the method, this takes place, for example, when the coupling request K1 is received or when a voice is detected in the environment. Both designs can also be combined.

Figure 3:
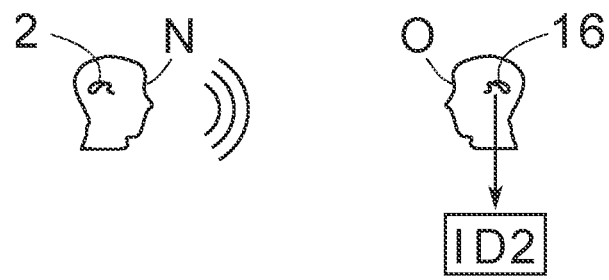
FIG. 3 shows the generation of an external acoustic ID.

In the design shown, the second hearing device 16 has, as shown in FIG. 1, a microphone 8 which it uses to record a voice from the environment, and from this generates the second acoustic ID ID2. An example of this is illustrated in FIG. 3. The voice is initially any voice in the environment, but not the voice of the second user O. Accordingly, the voice recorded by the second hearing device 16 is an external voice, i.e. either the actual voice of the first user N as shown in FIG. 3, provided that it is within range of the microphone 8, or a different voice. It is particularly important that the second hearing device 16 searches the environment for voices of other users N. As soon as a voice is found, an acoustic ID ID2 is advantageously generated directly from it, to be used later in coupling. In this case, this external ID ID2 is also stored in the memory 18. In this way a given hearing device 2, 16 collects multiple external IDs ID2 over time, which are then compared with any ID ID1 that might be received, as shown in FIG. 2. In a possible design, the step shown in FIG. 3 is part of the method shown in FIG. 2.

FIGS. 2 and 3 show that two different transmission channels are used to identify a user N. On the one hand, the first hearing device 2 transmits an ID ID1 of the first user N via a signal path by sending the first ID ID1 as an electromagnetic signal to other hearing devices 16 in the environment via the interface 14. On the other hand, the second hearing device 16 generates an ID ID2 of a user N over an air path by recording the voice of this user N as an acoustic signal with a microphone 8 and then generating the second acoustic ID ID2. Finally, the second hearing device 16 compares the two IDs ID1, ID2, which were obtained from different transmission channels, in order to identify the first user N. This process does not require any interaction between the users N, O and in the present case none takes place, instead the entire method is performed automatically by the hearing devices 2, 16. Instead of determining the second ID2 directly during the method, in an arrangement not explicitly shown the ID2 is stored in the memory 18 of the hearing device 16. However, it is important that the ID2 was generated from the voice of the first user N so that this user can be identified accordingly.

After the two hearing devices 2, 16 have been coupled to each other, a data exchange is possible. In the design described here, the voices of the users N, O are transmitted during the data exchange, so that a radio connection is implemented. In other words, each hearing device 2,16 records the voice of its own user N, O with its microphone 8. The microphone 8 generates a corresponding audio signal, which is further processed or not depending on the design, and is then transmitted to the other hearing device 2, 16 via the interface 14. This is not explicitly shown in FIG. 1, but it is suitable, for example, to transmit the input signal E via the interface 14. The other hearing device 2, 16 receives the voice of the now other user N, O and converts it back into sound by means of the receiver 12, for output to its own user N, O.

The emission of the coupling request K1 with the first, own ID ID1 is inherently independent of the presence of the second and generally, any other user O. In the present case, however, the coupling request K1 is only emitted if the first hearing device 2 detects that a second hearing device 16 is within range. For this purpose, the first hearing device 2 emits the first acoustic ID ID1 when the first hearing device 2 detects a conversation situation. A conversation situation here is understood to mean that at least two users N, O, e.g. as shown in FIG. 3, are speaking to each other, typically taking turns. Thus if the first hearing device 2 detects the presence of another user O in the environment, the request mode is thereby activated and the first ID ID1, i.e. the device's own ID ID1, is emitted. This ensures that the first ID ID1 is only emitted when a potential coupling partner is also actually present.

In order to detect the presence of another user N, O, in the present case each hearing device 2, 16 is designed to detect an external voice. For this purpose, the respective microphone 8 and the respective voice analysis unit 6 are also used in this case. The hearing device 2, 16 uses the microphone 8 to record sound from the environment, generate an input signal E from it and supply this signal to the voice analysis unit 6. The unit then detects whether or not an external voice is present in the environment. For this purpose, for example, a voice is first extracted from the sound and an acoustic ID ID2 is generated from it. This is then compared, for example, with the acoustic ID ID1 of the user N assigned to the hearing device 2, i.e. the user's own ID. For example, the user's own ID is stored in the memory 18 of the hearing device 2 or is generated by it, for example also using the voice analysis unit 6.

Figure 4:
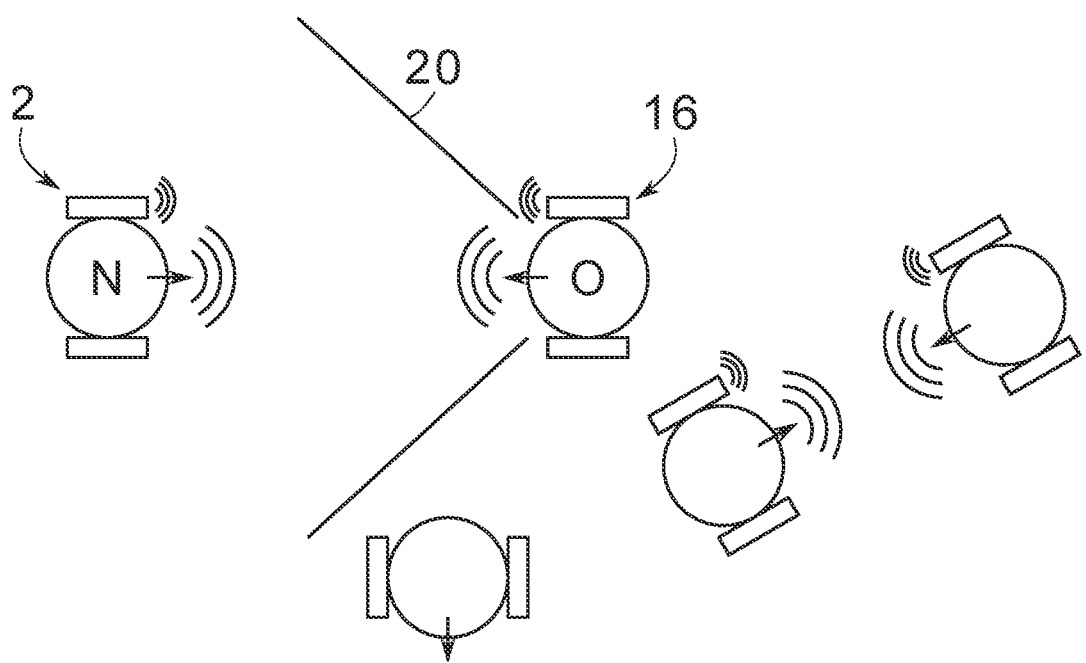
FIG. 4 shows a conversation situation.

However, there may be multiple external voices present and the conversation is not necessarily intended to involve all of the associated users N, O. In other words, the conversation situation may possibly be limited to a subset of users N, O in the environment. Typically, a conversation situation exists only with such external users O as are positioned in front of the user N, i.e. located facing the user. An example of this is shown in FIG. 4. There, for the second acoustic ID ID2 the second hearing device 16 records a voice from only a subregion 20 of the environment, namely from a subregion 20 in which a conversation partner of the second user O is potentially present. In FIG. 4, this subregion 20 is a frontal quadrant of space in front of the second user O. In a design not shown, the subregion 20 is a directional lobe of a beamformer of the hearing device 16. Overall, the coupling of the hearing devices 2, 16 is therefore direction-dependent.

Figure 5:
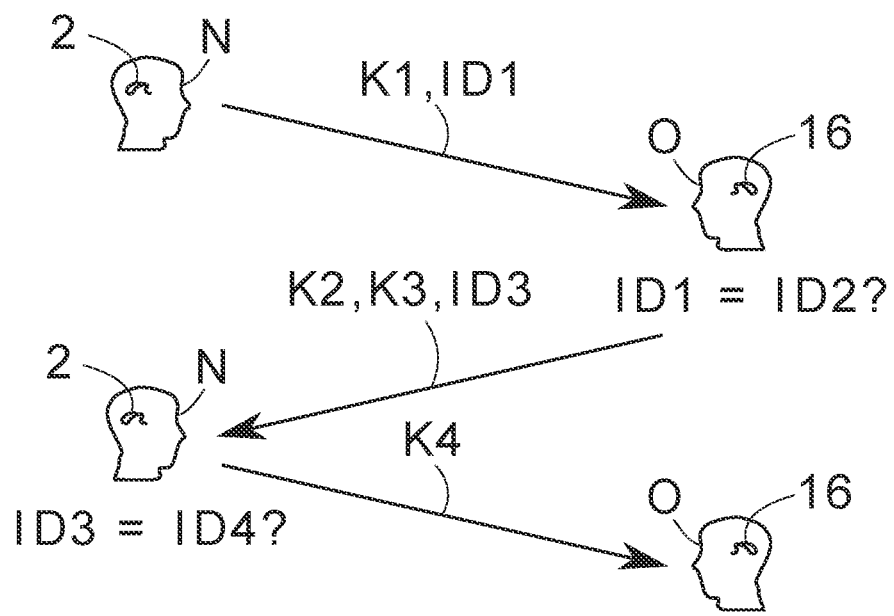
FIG. 5 shows a variant of the method of FIG. 2.

A successful coupling of the two hearing devices requires the emission of the coupling request K1 by the first hearing device 2, its reception by the second hearing device 16 and vice versa, the emission of the pairing acceptance K2 by the second hearing device 16 and its reception by the first hearing device 2, as also shown in FIG. 2. This means that at least the first user N is identified. In FIG. 5, analogous to the illustration in FIG. 2, a variant is shown in which for the coupling the same steps are additionally executed in reverse in order also to identify the second user O in the same way. In the exemplary embodiment shown, the coupling acceptance K2 of the second hearing device 16 contains a coupling request K3 to the first hearing device 2. This coupling request K3 includes the second user O's own acoustic ID ID3, which—as for the first ID ID1—is received by the first hearing device 2 and—as for the second ID ID2—is compared with a stored external acoustic ID ID4. The statements given for FIG. 3 are correspondingly applicable in reverse, so that for this purpose the ID4 is generated by the first hearing device 2 from the voice of the user O. The hearing devices 2, 16 thus perform a bidirectional comparison of the IDs ID1, ID3 of the two users N, O. The first hearing device 2 then also emits a pairing acceptance K4 to the second hearing device 16 if the acoustic ID ID3 of the second user 2 matches the stored acoustic ID ID4. In one design, the stored acoustic ID ID4 is generated from the ambient sound by the voice analysis unit 6, as already described above.

The embodiment according to FIG. 2 is used, for example, in a situation in which two users N, O each with a hearing device 2, 16 approach each other and begin to talk to each other. The first hearing device 2 uses the microphone 8 to detect that another user O is present in the environment and is also speaking. This first hearing device 2 therefore emits the acoustic ID ID1 of its own user N. This first ID ID1 is received by the second hearing device 16 via its interface 14. The second hearing device 16 now uses its microphone 8 to record sound from the environment and extracts the voice of the first user N. From this voice an acoustic ID ID2 is generated, which in the configuration described is an ID of the first user N exactly like the first acoustic ID ID1. When comparing the two IDs ID1, ID2, i.e. the self-generated ID ID2 on the one hand and the received ID ID1 on the other, the second hearing device 16 now finds that the IDs ID1, ID2 match and that the hearing device 2 of the first user N is therefore ready for coupling. Upon finding this, the second hearing device 16 emits the pairing acceptance K2 to the first hearing device, on receipt of which by the first hearing device 2 the coupling is then carried out. As an alternative, the coupling takes place as shown in FIG. 5, after the second hearing device 16 has conversely also transmitted a self-generated ID ID3 of the second user O to the first hearing device 2 and this has been successfully compared by the first hearing device 2 with an ID ID4 of the second user O generated by it. This ID ID4 is generated by the first hearing device 2, for example, by the first hearing device 2 using its microphone 8, analogously to the second hearing device 16 in FIG. 2, to record sound from the environment and examine it for voices.

The respective acoustic ID ID1, ID2, ID3, ID4 in the present case is generated based on at least one voice parameter of a respective voice and is selected from a set of voice parameters, comprising: vocal tract frequency, volume, voice frequency, also known as pitch, voice increase, speech rate, frequency range, respiration rate, resting level, vowel-consonant changes. In principle, even the use of a single voice parameter is sufficient, but a combination of a plurality of voice parameters is more appropriate when generating an ID ID1, ID2, ID3, ID4.

All of the above-mentioned voice parameters can be easily determined from the input signal E of the microphone 8 of the respective hearing device 2, 16, for example by means of a level, frequency, spectral or time-domain analysis, which are each components of the control unit 4 of the respective hearing device 2, 16, for example. The way in which the individual voice parameters are actually determined is of secondary importance.

Figure 6:
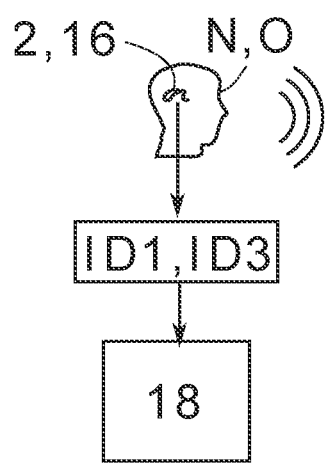
FIG. 6 illustrates the generation of the device's own acoustic ID.

For example, the first ID ID1, which is emitted by the first hearing device 2 as a coupling request K1, is stored in the memory 18 of the first hearing device 2. Analogously the second user O's own acoustic ID ID3, which is emitted with the coupling request K3, is stored in the memory 18 of the second hearing device 16, for example. In a possible design these IDs ID1, ID3 are determined as part of a calibration procedure, not explicitly shown, and then stored. Alternatively, or additionally, these two own IDs ID1, ID3 are generated by the respective hearing device 2, 16, by recording the respective user N, O's own voice, as shown by way of example in FIG. 6. The hearing device 2, 16 also measures one or more voice parameters and from these it then generates the ID ID1, ID3 of the device's own user N, O. In FIG. 6 this is also stored in the memory 18 of the hearing device 2, 16 for later, repeated use, however this is purely optional.

In the exemplary embodiments shown the respective external acoustic ID ID1, ID2, ID3, ID4 is stored in a contact database 22 of the respective hearing device 2, 16. The contact database 22 is thus a kind of telephone book and allows for easier coupling in the event of a repeated coupling of the users N, O. The acoustic ID ID2, ID4 does not then have to be generated again each time using the microphone 8 and the voice analysis unit 6, instead the IDs ID1, ID2, ID3, ID4 stored in the contact database 22 are directly compared with a received ID ID1, ID3 in order to identify a user N, O. In the exemplary embodiment of FIG. 1, the contact database 20 is part of the memory 18.

The following is a summary list of reference numerals and the corresponding structure used in the above description of the invention:

2 hearing device, first hearing device
4 control unit
6 voice analysis unit
8 microphone
10 signal processor
12 receiver
14 interface
16 second hearing device
18 memory
20 subregion
22 contact database
A output signal
E input signal
ID1 acoustic ID
ID2 acoustic ID
ID3 acoustic ID
ID4 acoustic ID
K1 coupling request
K2 coupling acceptance
K3 coupling request
K4 coupling acceptance
N, O user

The invention claimed is:

1. A method, comprising:
providing a first hearing device that is assigned to a first user and a second hearing device that is assigned to a second user;
emitting a coupling request from the first hearing device, the coupling request being a first acoustic ID of a voice of the first user;
receiving the first acoustic ID with the second hearing device and comparing the first acoustic ID with a second acoustic ID; and
if the first acoustic ID matches the second acoustic ID, emitting a coupling acceptance with the second hearing device, and coupling the first hearing device with the second hearing device for data exchange between the first and second two hearing devices.

2. The method according to claim 1, wherein the second hearing device has a microphone used to record a voice from the environment and to generate the second acoustic ID.

3. The method according to claim 1, which comprises transmitting voices of the first and second users during the data exchange.

4. The method according to claim 1, which comprises emitting the first acoustic ID with the first hearing device when the first hearing device detects a conversation situation.

5. The method according to claim 1, wherein for determining the second acoustic ID, recording with the second hearing device only a voice from a subregion of the environment in which a conversation partner of the second user is potentially present.

6. The method according to claim 1, wherein:
the coupling acceptance contains a coupling request to the first hearing device comprising an acoustic ID of the second user, which is received by the first hearing device and compared with a stored acoustic ID; and
the first hearing device emits a coupling acceptance to the second hearing device if the acoustic ID of the second user matches the stored acoustic ID.

7. The method according to claim 1, which comprises generating the respective acoustic ID based on at least one voice parameter of a respective voice and selecting the voice parameters from a set of voice parameters consisting of vocal tract frequency, volume, voice pitch, voice increase, speech rate, frequency range, respiration rate, resting level, and vowel-consonant changes.

8. The method according to claim 1, which comprises storing the first acoustic ID in a memory of the first hearing device.

9. The method according to claim 1, which comprises generating the first acoustic ID by the first hearing device by recording the first user's own voice with the first hearing device.

10. The method according to claim 1, which comprises storing the respective acoustic ID in a contact database of the respective hearing device.

11. The method according to claim 1, wherein each of the first and second hearing devices has a wireless interface for data exchange.

12. The method according to claim 11, wherein the wireless interface is a Bluetooth interface.

13. A hearing device configured to perform the method according to claim 1.

* * * * *